United States Patent
Lapin et al.

(10) Patent No.: US 6,965,541 B2
(45) Date of Patent: Nov. 15, 2005

(54) GUN SHOT DIGITAL IMAGING SYSTEM

(75) Inventors: Brett D. Lapin, Alexandria, VA (US); Nicholas D. Beser, Owings Mills, MD (US)

(73) Assignee: The Johns Hopkins University, Baltimore, MD (US)

(*) Notice: Subject to any disclaimer, the term of this patent is extended or adjusted under 35 U.S.C. 154(b) by 0 days.

(21) Appl. No.: 10/704,183

(22) Filed: Nov. 7, 2003

(65) Prior Publication Data

US 2005/0088915 A1 Apr. 28, 2005

Related U.S. Application Data

(60) Provisional application No. 60/436,271, filed on Dec. 24, 2002.

(51) Int. Cl.[7] .............................................. G01S 3/80
(52) U.S. Cl. ..................................................... 367/118
(58) Field of Search ................................. 367/118, 121, 367/123, 124, 125, 127, 129, 96, 136

(56) References Cited

U.S. PATENT DOCUMENTS

| | | | |
|---|---|---|---|
| 2,962,696 A | 11/1960 | Snyder | 367/129 |
| 5,455,868 A | 10/1995 | Sergent et al. | 381/56 |
| 5,504,717 A | 4/1996 | Sharkey et al. | 367/124 |
| 5,586,086 A | 12/1996 | Permuy et al. | 367/127 |
| 5,831,936 A | 11/1998 | Zlotnick et al. | 367/124 |
| 5,912,862 A | 6/1999 | Gustavsen et al. | 367/129 |

(Continued)

OTHER PUBLICATIONS

Document: US Statutory Invention Registration No. H1,916, Date: Nov. 7, 2000, Name: Hollander, 367/118.

Electronic Counter Sniper Measures; from Defense Advanced Research Projects Agency (DARPA) website; no date or author cited.

Sniper Location Systems; http://www.sentech–acoustic-.com/page5.htm; no date or author cited.

Acoustic counter–sniper system; presented at SPIE International Symposium on Enabling Technologies for Law Enforcement and Security, Nov. 19–21, 1996 in Boston, MA; SPIE Proceedings vol. 2938; pages unnumbered; G. L. Duckworth, D. C. Gilbert, J. E. Barger.

Shot Spotter, The 9–1–1 Gunfire Alert System: An Operational Gunshot Location System, SPIE International Symposium on Enabling Technologies for Law Enforcement and Security, Nov. 19–21, 1996 in Boston, MA; Robert Showen from website http://www.shotspotter.com/whitepapers.shtml.

Spotting a shooter with sound waves; Nov. 3, 1997; Lori Waffenschmidt contributed to article. Sci–Tech Story page website http://www.cnn.com./TECH/9711/03/bullet.ears/.

Using Gunshot Detectoin Technology in High–Crime Areas, National Institute of Justice Research Preview, Jun. 1998; summary of presentation by Lorraine Green Mazerolle.

Random Gunfire Problems and Gunshot Detection Systems, National Institue of Justice Research in Brief, Dec. 1999, Lorraine Green Mazerolle, Cory Watkins, Dennis Rogan, and James Frank.

Gun Shot Detection System; Feb. 16, 2001; Peter Cstelli, Glenn Daly, Joseph Ferraro.

*Primary Examiner*—Daniel Pihulic
(74) *Attorney, Agent, or Firm*—Benjamin Y. Roca, Esq.

(57) ABSTRACT

Disclosed is a method for recording one or more images of a source area where an impulse sound has initiated. The recording is performed by at least one of a plurality of units that include a camera, a computing device, and a connection to a network. The method comprises the steps of detecting and calculating a range and direction of the impulse sound source; slewing the camera to align its optical axis with a direction of the impulse sound; determining whether the impulse sound was a gunshot; recording images of the source area; and alerting a plurality of neighboring units to perform the recording step.

19 Claims, 2 Drawing Sheets

U.S. PATENT DOCUMENTS

| | | |
|---|---|---|
| 5,917,775 A | 6/1999 | Salisbury ..................... 367/93 |
| 5,930,202 A | 7/1999 | Duckworth et al. ........ 367/127 |
| 5,973,998 A | 10/1999 | Showen et al. ............. 367/124 |
| 6,178,141 B1 | 1/2001 | Duckworth et al. ........ 367/127 |
| 2002/0003470 A1 | 1/2002 | Auerbach ................ 340/425.5 |
| 2002/0167862 A1 * | 11/2002 | Tomasi et al. .............. 367/118 |
| 2004/0240322 A1 * | 12/2004 | Szajnowski ................ 367/124 |

* cited by examiner

BLOCK DIAGRAM FOR NORMAL OPERATIONS AND ALERT MODE

GUN SHOT DIGITAL IMAGING SYSTEM

CROSS-REFERENCE TO RELATED APPLICATIONS

This application claims the benefit of U.S. Provisional Application No. 60/436,271 filed Dec. 24, 2002, the contents of which are incorporated herein by reference.

BACKGROUND OF THE INVENTION

1. Field of the Invention

The present invention generally relates to gunshot detection. More particularly, the present invention is directed to using multiple installations of sound detection an recording devices for detecting firing of a gun or an explosion, identifying of a location of such firing or explosion, and recording images of an area of a source of the firing or explosion and of a possible suspect of such firing or explosion.

2. Description of the Related Art

Violence and criminal activity involving firearms is a significant problem for most metropolitan areas in the United States, and numerous suburban areas as well. Two of the problems facing law enforcement authorities when handling these types of crimes are (1) the speed at which the violence begins and ends and (2) the relative ease and speed at which the perpetrators can disappear into the urban landscape.

At no time have these problems been emphasized more than during the sniper killings of October 2002 in the greater Washington, D.C. area. With killings occurring almost at will, local and federal law enforcement agencies were being constantly stifled by the lack of reliable descriptions of exactly who and what they were looking for.

All law enforcement agencies agree that having reliable, accurate intelligence of who and what took part in a violent crime can enormously enhance their ability to apprehend the perpetrators. Similarly, counter-terrorism efforts of sovereign governments abroad and the Department of Homeland Security would be greatly helped in their fight against organized crime and terrorism if they had at their disposal a network of systems to detect, pinpoint, and record an event e.g., a shooting or an explosion, immediately upon the event occurring, as well as those involved in carrying out the crime.

Presently, technology has no capability to image the origin of a gunshot event immediately upon its detection. Existing technology is only able to report the location of such event. Certain existing infrared (IR) systems can detect a muzzle flash from a gunshot and subsequently localize the presence of the gun. However, these systems are extremely limited, because the imaging system must have the muzzle of the gun being fired in the field of view and much more often than not the muzzle is hidden.

There are also numerous systems that utilize acoustic triangulation technology to locate the origin of gunshot events, these include AAI Corporation's PDCue Counter Sniper Systems, Trilon Technology's Shot Spotter, and Tag-It. Similarly, digital imaging systems are plentiful. There is, however, no known system that integrates the two technologies, i.e., acoustic triangulation, and reporting the location of an event.

Gunshot Range and Direction Detection

Gunshot range and direction indicators have been developed for the military to help in locating snipers. Six different phenomenologies have been exploited in developing different systems to accomplish this task: (1) muzzle blast; (2) bullet shockwave; (3) muzzle flash; (4) bullet-in-flight heat signature; (5) optical laser reflection; and (6) vortex gradients in atmospheric refractive index.

However, all but one of the most promising of these phenomenologies are contingent on aspects of the military application that are different from the civilian law enforcement/Homeland Security application. In the military environment, gunshots are being aimed in the general direction of the friendly forces, and hence in the general direction of the detection system itself. The law enforcement application cannot make a determination of the direction of the criminal perpetrator's actions before the event, and hence there exists a need for a system designed for near omnidirectional detection and image gathering.

In the urban setting, the range and direction of the gunshot can only be determined reliably by triangulating the acoustic sound wave produced by the firearm's muzzle blast. Current versions of these types of systems use acoustic sensors separated by sufficient distances so as to enable accurate calculations. Upon each sensor detecting the gunshot's sound wave, a computing device records the times of sound arrival and subsequently triangulates the source location and direction of the sound. Initial testing of current systems by the companies developing them, has indicated that accurate responses at the desired range, e.g., about one kilometer, are feasible, although the accuracy is heavily conditioned on sensor separation.

It would therefore be desirable to provide a system to detect a gunshot, determine the direction from which it was fired, identify the ground zero location of the gunshot event, and initiate recording of the area of the event immediately upon the event occurring.

SUMMARY OF THE INVENTION

Using acoustic triangulation technology, the present invention spatially localizes a gunshot. Such localization yields direction and range from the sensors of the source to be observed, subsequently triggering a digital imaging system to acquire the location of the gunshot in the field of view and begin recording. Zooming parameters and subsequent resolution of the imaging system is automatically set by the detected range. The most likely moving candidates or initiators of the gunshot origin will be identified, and multiple cameras of the inventive system located in the vicinity of the gunshot will be triggered to begin recording also.

Digital motion imagery, either multiple digital still images or digital video stream, will be recorded in the computing device embedded in the inventive system and locally stored. Total duration of digital motion imagery and image resolution will be determined according to system resources. Although one image may suffice in apprehending the perpetrator, a minimum duration of no less than about 30 seconds is preferred.

Units of the system of the present invention are positioned around a region. These units are able to communicate with each other to alert each to an event detected by one of the units. Subsequently, the units within a predefined distance of the initial event will respond to the alert by orienting itself in accordance with received information by using it onboard Global Positioning System (GPS), and will begin recording digital imagery. Additionally, the system of the present invention will communicate pertinent imagery data to those in control of the installation, e.g., a local law enforcement agency, a private security organization, an authorized concerned citizen's organization, etc. The system of the present invention can also be remotely accessible via secure wired or wireless network technology for imagery downloads on command.

The present invention advantageously integrates acoustic detection and digital imaging technologies yielding rapid detection, imaging, and tracking of gunshot origins. The acoustic sensing creates an omni-present detection system, triangulating the location of the gunshot without any limitations except range due to sensor sensitivity. The digital imaging system is mounted on a high-slew rate gimballed (ball jointed) system that reacts immediately and slews the imager to point in the direction of the detected acoustic input, hence the field of view of the cameras of the invention is not static but dynamic. The system of the present invention uses an acoustic triangulation algorithm for gunshot localization, and a tracking algorithm for imager field of view management.

Another feature of the present invention is a method for recording one or more images, or video, of a source area where an impulse sound has initiated. The recording is performed by at least one of a plurality of units that include a camera, a computing device, and a connection to a network. The method comprises the steps of (a) detecting and calculating a range and direction of the impulse sound source; (b) stewing the camera to align its optical axis with a direction of the impulse sound; (c) determining whether the impulse sound was a gunshot; recording images of the source area; and (d) alerting a plurality of neighboring units to perform the recording step.

BRIEF DESCRIPTION OF THE DRAWINGS

The foregoing and other objects, aspects, and advantages of the present invention will be better understood from the following detailed description of preferred embodiments of the invention with reference to the accompanying drawings that include the following.

DETAILED DESCRIPTION OF THE PREFERRED EMBODIMENTS

The present invention is directed to a system for detecting and imaging gunshot events. The system of the present invention records still and/or motion imagery of locations of gunshot events immediately upon occurrence of the events. The system of the present invention performs as follows:

1. Upon detecting an impulse sound, the system
   a) Calculates a range and direction of the impulse sound source when it occurs within a specified distance, for example a distance of about one kilometer from the installation of the apparatus of the inventive system. (All target requirements are dependent on constraints of existing technology.)
   b) Slews a digital imaging system to align its optical axis with the direction of the impulse sound within a specified response time for detection, for example, about 500 milliseconds and preferably about 100 milliseconds. A 'slewing' motion may be described as a typically sharp pivoting or turning motion about an axis. For a camera it would be a rapid pan and/or tilt.
   c) Determines whether the impulse sound was a gunshot and upon that determination the system will
      i) begin viewing and recording the source area; and,
      ii) alert any neighboring installations of the inventive systems to the event, which will use onboard global positioning system (GPS) receivers in concert with transmitted direction data to slew their imagers to view areas neighboring the gunshot location.
2. Once correctly oriented, a time-synchronized digital motion imagery is recorded and stored within each system unit.
3. The system may be addressable by a direct connection, a telephone and wireless links to enable inter-system communication and for downloading stored motion imagery to authorized central servers, located for example in a local police precinct, or to various authorized computing devices seeking stored information, for example police cruisers.

Imagery Subsystem

Decisions that must be made during imagery subsystem design include phenomenology, e.g., infrared (IR) vs. visual; modality, e.g., high definition video vs. high resolution still sequencing; and compression, e.g., digital video, Moving Picture Experts Group (MPEG-2), or National Television System Committee (NTSC). Candidate camera and mount systems must be reviewed for both the visible and IR domains. High definition images are necessary to maximize the detail at high distances. The IR approach also supports low light level image collection conditions.

Figure 1:
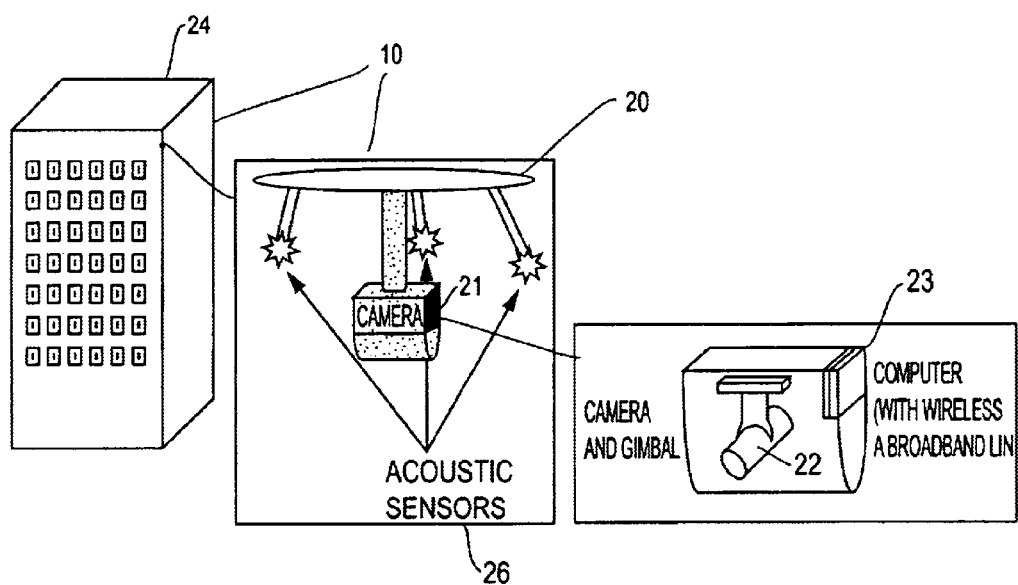
FIG. 1 is a diagram a preferred embodiment of inventive components and a manner of installation of the inventive system; and, FIG. 2 is a block diagram showing normal and alert mode operation steps of the inventive system.

FIG. 1 illustrates an exemplary installation of one unit and details of the individual unit 10 installation of the inventive system. The controllable mount 20 may be selected from commercially available units after considering the requirements of slew accuracy, slew speed, and size and weight constraints of the mount 20. The mount's slew accuracy will determine if the mount 20 can accurately point to a selected location after moving at high speeds. A computer-controlled mount 20 with optical positioning that will permit directed movement of the image recorder or camera 22 to a selected location within 0.1 second, as a target requirement is obtained in the present example. Initial product surveys indicate that slew rates of 50–250 degrees per second are readily available, these rates approach those of desired system flexibility and speed. Mounts 20 that are capable of 0.5 degree accuracy are also available commercially. It is to be understood that the system of the present invention envisions adapting and using a commonly available gunshot ranging and direction detector/calculator that uses acoustic triangulation.

Depending on the optics of the sensor, a 30 degree field of view (FOV) camera 22 can zoom to a 1 degree FOV. The extreme or very long range of the unit 10 of the system of the present invention will also determine the type of forensic imaging data that can be obtained. Although it is unlikely, given the state of optical technology, that a car license plate may be read by the system from a small image at maximum specified distances, the shape, color, model, and model year of the car can be easily determined, as well as cursory details of the perpetrators themselves. Also, if the event occurs at ranges closer than maximum, then discerning license plates is certainly a possibility.

The exact selection of the camera mount 20 will depend on the selection and availability of a high resolution visible and IR camera 22. The mount features are determined by the weight of the camera/lens system 22 and an option of mounting two or more cameras 22 together. Higher weight systems may have reduced slew rates and potentially lower accuracy.

Integration

Figure 2:
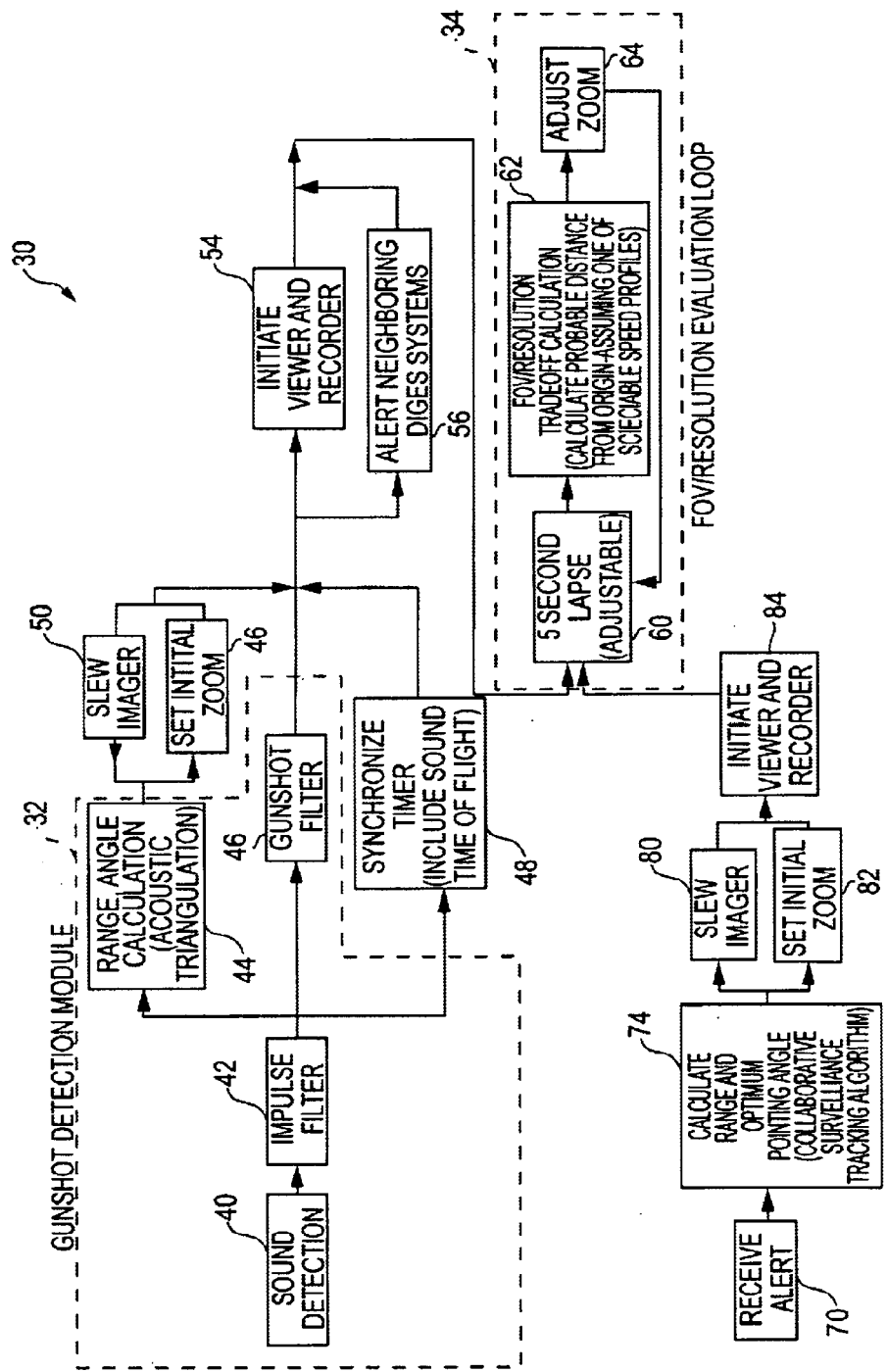

FIG. 2 illustrates a block diagram of a method 30 of the present invention in a normal mode of operations and in an alert mode. Integration of the gunshot detection, described above in the "Gunshot Range and Direction Detection" section, and the imagery subsystems described above, involve logic 32 that controls the stewing of the camera mount 20 (FIG. 1) to the required direction, and direct the zoom setting to the required ranges. As the timeline increases from the gunshot event, the zoom setting will shift outward in order to increase the FOV.

In the normal mode of operations, the logical sequence 32, detects a signal from acoustic sensors 26 (FIG. 1) mounted on the mount 20 of individual unit 10 of the invention, which signal is provided to a sound detection module 40. The detected sound signal is then provided to an impulse filter module 42, which forwards it to (1) a range and angle calculation module 44 to perform acoustic triangulation, (2) a gunshot filter module for identification of the received sound as that of a gunshot and (3) a Synchronization Timer module 48, whose calculation includes the sound's time of flight. Module 44 processes sound impulse data and forwards its range and direction calculations to the Slewing Imager 50 and Zoom Setting 52 modules which generate appropriate mount and camera settings.

Once the above-described modules have completed their tasks (the imager is at the correct pointing angle, and the timer has been synchronized), and if the sound is determined to be a gunshot, then an Initialization module 54 initiates recording (be it still or motion imagery) and the system enters the FOV/Zoom Adjustment loop 34. Also, an Alert module 56 alerts neighboring duplicate sister units 10 (FIG. 1).

When alerted the sister units 10 do not need to determine whether the sound is a gunshot, instead the Receive Alert module 70 forwards the source location information received by the Alert module 56 to the Range and Angle Calculation module 74 to perform collaborative surveillance by determining best range and angle data for each corresponding sister unit. Module 74 forwards the resultant range and angle to the Slewing Imager 80 and Zoom Setting 82 modules, which generate appropriate mount and camera settings. Once these tasks have been completed (the imager is at the correct pointing angle), then an Initialization module 84 initiates recording (be it still or motion imagery) and the system enters the FOV/Zoom Adjustment loop 34.

The logical sequence 34 constantly re-balances the FOV with the resolution needed to obtain the greatest amount of event details. That is, a larger FOV yields a lower resolution, and hence less details, but a smaller FOV doesn't cover as much area. Hence, a balance must be kept between FOV and resolution. The combined accuracy of the direction and angle of the gunshot source will dictate what the starting (highest) zoom, and starting (narrowest) FOV of the imager will be.

After receiving the initiation signal from modules 54 or 84 the delay module 60 allows a short user adjustable delay before the zoom is readjusted. After the lapse, a module 62 calculates a probable distance from origin of the gunshot perpetrator. The module 62 allows various perpetrator speed profiles for the FOV adjustment. After the calculation is made, zoom adjustment module 64 utilizes it in adjusting the camera 22 lens and passes control to the delay module 60 for the resolution adjustment recalculation process to iterate.

Communications between a command and control center on each of the installed systems are accomplished on a variety of levels.

1. An installed landline modem allows not only remote downloads of recorded imagery, but also will enable each system to communicate with the other systems on its network. This enables the alert mechanism to direct nearest neighbor installations 10 (FIG. 1) of the system of the present invention to respond to an event out of their sensing zones, and record imagery of possible escape routes of perpetrators. Onboard GPS receivers will allow each system to have a frame of reference for networked responses.

2. Wireless links will be incorporated to also allow remote downloads, but in addition will enable mobile downloads. This latter capability will allow law enforcement officers to download imagery while en route, and could also be configured to allow officers to obtain live feeds of criminal activities once authorization is granted.

3. All installations of the inventive system 10 (FIG. 1) can be connected to a network cable, such as the Ethernet cable, T1–T3 lines, fiber-optic cables, etc. installed in a building or structure 24 (FIG. 1) on which the system is installed.

Finally, the onboard central computer 23, responsible for conducting the integrated operations of the gunshot detection and imaging subsystems of the inventive system 10 (FIG. 1), is also responsible for performing all time-dependent operations. These include synchronizing elapsed time with the recorded imagery, adjusting the time-dependent zoom setting, and also determining the size of the area that the imager should be interested in, which expands as elapsed time increases.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A method of recording one or more images of a source area of an impulse sound by at least one of a plurality of units including a camera, a computing device, and a connection to a network, said method comprising the steps of:

detecting the impulse sound;

calculating a range and direction of the impulse sound source;

slewing the camera to align its optical axis with a direction of the impulse sound determining whether the impulse sound was a gunshot;

recording images of the source area; and, alerting a plurality of neighboring units to perform the recording step.

2. The method of claim 1, wherein the impulse sound occurs within a distance of a desired requirement from an installation of the units.

3. The method of claim 2, wherein said desired requirement is a distance not to exceed about one kilometer.

4. The method of claim 1, wherein the camera is a selected from one of a still and video digital imaging system and images are stored on storage media of a computing device.

5. The method of claim 4, wherein the step of alerting further comprises aligning the camera of the plurality of alerted neighboring units.

6. The method of claim 1, wherein the slewing step is performed within a response time of a desired requirement of a sound detection.

7. The method of claim 6, wherein the desired requirement is a response time not to exceed about 500 milliseconds.

8. The method of claim 1, further comprising receiving direction data and using onboard global positioning system (GPS) receivers to select those cameras of neighboring units to be slewed and record images of the source area.

9. The method of claim 1, wherein said step of recording further comprises storing a time-synchronized digital motion imagery within each unit.

10. The method of claim 9, wherein the plurality of units are connected via a hardwired network.

11. The method of claim 9, wherein each unit is connected to the network via wireless means.

12. The method of claim 10, further comprising downloading stored motion imagery to an authorized reporting system in reply to a request.

13. A system for recording one or more images of a source area emitting an impulse sound comprising:
   a) one or more detection observation units including a plurality of acoustic sensors, at least one camera, a microphone, a computing device having storage media and a connection to a network;
   b) a gunshot detection module for receiving acoustic sensors' data and calculating a range and an angle at which the camera of the unit is to record images;
   c) a slew and zoom setting module for accepting the range and angle information and providing instructions for slewing and zooming the camera;
   d) an initiating and alerting module for initiating recording of images by the current detection observation unit and for alerting and passing coordinates to other detection observation units located in a vicinity of source area to initiate recording of images; and,
   e) a field of view (FOV) resolution evaluation module for continuously readjusting the focus of the camera.

14. The system of claim 13, wherein the camera is selected from one of still or video imaging devices.

15. The system of claim 13, further comprising a global positioning system (GPS) for allowing neighboring units to direct their cameras to the source area of the impulse sound.

16. The system of claim 13, further comprising a receive alert module for receiving an alert signal from an alerting module of another detection observation unit and performing steps (b)–(e).

17. The system of claim 13, further comprising a synchronization module for coordinating image recordation by the plurality of units.

18. A computer program device readable by a machine, tangibly embodying a program of instructions executable by the machine to perform method steps for a method of recording one or more images of a source area of an impulse sound by at least one of a plurality of units including a camera (still or video), a computing device, and a connection to a network, said method comprising the steps of:
   detecting the impulse sound;
   calculating a range and direction of the impulse sound source;
   stewing the camera to align its optical axis with a direction of the impulse sound
   determining whether the impulse sound was a gunshot;
   recording images of the source area; and
   alerting a plurality of neighboring units to perform the recording step.

19. The device of claim 18, wherein the camera is selected from one of still or video imaging devices.

* * * * *

UNITED STATES PATENT AND TRADEMARK OFFICE
CERTIFICATE OF CORRECTION

PATENT NO. : 6,965,541 B2 Page 1 of 1
DATED : November 15, 2005
INVENTOR(S) : Brett D. Lapin and Nicholas D. Beser It is certified that error appears in the above-identified patent and that said Letters Patent is hereby corrected as shown below:

Column 8,
Line 11, delete "stewing" and insert -- slewing --.

Signed and Sealed this

Eleventh Day of April, 2006

JON W. DUDAS
*Director of the United States Patent and Trademark Office*